United States Patent
Kudo et al.

(10) Patent No.: US 7,654,573 B2
(45) Date of Patent: Feb. 2, 2010

(54) SEAT BELT DEVICE FOR VEHICLE

(75) Inventors: Toshiya Kudo, Anjyou (JP); Hideki Kato, Nissin (JP); Ryoutarou Kachuu, Aichi-ken (JP); Takuya Nezaki, Mizunami (JP); Kazuyoshi Isaji, Kariya (JP)

(73) Assignees: Toyota Jidosha Kabushiki Kasha (JP); Denso Corporation (JP)

( * ) Notice: Subject to any disclaimer, the term of this patent is extended or adjusted under 35 U.S.C. 154(b) by 147 days.

(21) Appl. No.: 10/542,949

(22) PCT Filed: Jan. 21, 2004

(86) PCT No.: PCT/JP2004/000472

§ 371 (c)(1),
(2), (4) Date: Jul. 21, 2005

(87) PCT Pub. No.: WO2004/065181

PCT Pub. Date: Aug. 5, 2004

(65) Prior Publication Data
US 2006/0237960 A1    Oct. 26, 2006

(30) Foreign Application Priority Data
Jan. 21, 2003    (JP) .............................. 2003-012646

(51) Int. Cl.
*B60R 22/405* (2006.01)
(52) U.S. Cl. ...................................... 280/806; 180/268
(58) Field of Classification Search .................. 280/806; 340/425.5, 439, 435, 436, 438, 441, 450.1, 340/452, 453, 463, 467, 457; 180/268
See application file for complete search history.

(56) References Cited

U.S. PATENT DOCUMENTS 5,748,477 A * 5/1998 Katoh .......................... 701/301

(Continued)

FOREIGN PATENT DOCUMENTS

DE    199 61 799    12/1999

(Continued)

OTHER PUBLICATIONS

Supplementary European Search Report dated Dec. 2, 2005.

*Primary Examiner*—Paul N Dickson
*Assistant Examiner*—Nicole Verley
(74) *Attorney, Agent, or Firm*—Finnegan, Henderson, Farabow, Garrett & Dunner, L.L.P.

(57) ABSTRACT

A seatbelt apparatus includes an electric motor 20 for winding a seatbelt 12, and a microcomputer 30 for controlling the electric motor 20. The microcomputer 30 controls the electric motor 20 so as to wind the seatbelt 12 at a winding load which increases to a first winding load at a first rising gradient when collision is detected using a detected length and a detected vehicle velocity by a length sensor 41 and a vehicle velocity sensor 42. The microcomputer 30 controls the electric motor 20 so as to wind the seatbelt 12 at a winding load which increases to a second winding load which is larger than the first winding load at a second rising gradient which is larger than the first rising gradient when an emergency braking operation is detected by detection signal from a brake switch 43. Therefore, the seatbelt can be wound at a winding mode and a winding load which can protect a passenger without giving much feeling of discomfort.

15 Claims, 3 Drawing Sheets

U.S. PATENT DOCUMENTS

| | | | |
|---|---|---|---|
| 6,394,495 B1 * | 5/2002 | Specht | 280/806 |
| 6,702,326 B1 * | 3/2004 | Fujii | 280/806 |
| 6,908,112 B2 * | 6/2005 | Yano et al. | 280/805 |
| 6,969,089 B2 * | 11/2005 | Klingauf et al. | 280/805 |
| 7,028,802 B2 * | 4/2006 | Tobata | 180/268 |
| 7,140,571 B2 * | 11/2006 | Hishon et al. | 242/390.8 |
| 2001/0054816 A1 * | 12/2001 | Brambilla et al. | 280/806 |
| 2003/0178836 A1 * | 9/2003 | Viano et al. | 280/806 |
| 2004/0122573 A1 * | 6/2004 | Mizutani | 701/45 |

FOREIGN PATENT DOCUMENTS

| | | |
|---|---|---|
| GB | 2 333 077 | 7/1999 |
| JP | 6-286581 | 10/1994 |
| JP | 11-334503 | 12/1999 |
| JP | 2000-118352 | 4/2000 |
| JP | 2001-151076 | 6/2001 |
| JP | 2001-239922 | 9/2001 |
| JP | 2002-200950 | 7/2002 |
| WO | WO 99/51469 | 10/1999 |
| WO | WO 03/051686 | 6/2003 |

* cited by examiner

SEAT BELT DEVICE FOR VEHICLE

This application claims the benefit, under 35 U.S.C. § 119, of Japanese application No. JP 2003-12646, filed Jan. 21, 2003, which is incorporated herein by reference.

TECHNICAL FIELD present invention relates to a vehicle seatbelt apparatus provided with a winder for winding a seatbelt.

BACKGROUND ART

Hitherto, an apparatus of this type is adapted to predict a collision with an object of collision and detect the collision as disclosed in Japanese Unexamined Patent Application Publication No. 6-286581. A seatbelt is wound at a first winding load when the collision is predicted. The seatbelt is wound at a second winding load which is larger than the first winding load when the collision is detected, As the apparatus in the related art as described above, although a passenger is protected by winding of seatbelt when a collision is predicted and when the collision is occurred, such winding of the seatbelt constrains the passenger, and if the constraining force of the seatbelt is too large, it gives the passenger a sense of discomfort. Therefore, it is desired to provide a winding mode and a winding load of the seatbelt which can protect a passenger while giving the passenger the sense of discomfort as little as possible.

DISCLOSURE OF THE INVENTION

In order to cope with the above-described problem, it is an object of the present invention to provide a vehicle seatbelt apparatus in which a seatbelt is wound at a winding mode and a winding load which can protect a passenger while giving a sense of discomfort as little as possible.

In order to achieve the above-described object, a characteristic of the vehicle seatbelt apparatus provided with a winder for winding a seatbelt according to the present invention is in that collision predicting means for predicting a collision with an object of collision, and first winding control means for controlling the winder so as to wind the seatbelt at a first winding load when a collision is predicted by the collision predicting means are provided. In this case, the first winding load may be set, for example to a value between 80 N and 120 N inclusive.

The characteristic of the present invention is also in that the collision predicting means for predicting the collision with the object of collision, and the first winding control means for controlling the winder so as to wind the seatbelt while increasing the winding load of the seatbelt at a first rising gradient from a moment when the collision is predicted by the collision predicting means. In this case, the first rising gradient may be set to a value equal to or larger than 100 N/180 ms and smaller than 100 N/100 ms. The winding load of the seatbelt which is increased by the first winding control means may be limited up to the first winding load.

In these characteristics of the present invention, the collision predicting means may be configured to have, for example, a radar device using extremely high-frequency wave (millimetric-wave), or ultrasonic wave, a camera, and the like, and to predict the collision by measuring a length to the object of collision (for example, a vehicle existing in front) and considering a velocity of the vehicle in question with respect to the measured length. For example, the collision predicting means may predict the collision with the object of collision by continuously detecting the length from the vehicle in question to the object of collision and, based on the detected length which varies with time. According to the present invention configured in this manner, when the collision is predicted, a constraining force of the seatbelt and variations in the constraining force is restricted, and hence the feeling of discomfort of the passenger due to the constraining force of the seatbelt can be alleviated.

Another characteristic of the vehicle seatbelt apparatus provided with the collision predicting means and the first winding control means of the present invention is also in that an emergency brake detecting means for detecting an emergency braking state, and second winding control means for controlling the winder so as to wind the seatbelt at a second winding load which is larger than the first winding load when the emergency braking state is detected by the emergency brake detecting means are provided. In this case, the second winding load may be set, for example, to a value equal to or larger than 150 N.

Another characteristic of the vehicle seatbelt apparatus provided with the collision predicting means and the first winding control means of the present invention is in that the emergency brake detecting means for detecting the emergency braking state, and the second winding control means for controlling the winder so as to wind the seatbelt while increasing the winding load of the seatbelt at a second rising gradient which is larger than the first rising gradient from a moment when the emergency braking state is detected by the emergency brake detecting means are provided. In this case, the second rising gradient may be set to a value equal to or larger than, for example, 100 N/100 ms. The winding load of the seatbelt which is increased by the second winding control means may be limited up to the second winding load.

In these or other characteristics of the present invention, the emergency brake detecting means may be adapted to detect a pressed amount, a pressing speed, and a pressing force of a brake pedal, or a brake hydraulic pressure and, when the detected value is equal to or larger than the predetermined value, to detect the emergency braking state.

The emergency braking state in these other characteristics of the present invention is based on the passenger's intension, and hence even when the winding load and the rising gradient of the winding load of the seatbelt is increased to a certain extent, the passenger does not have much feeling of discomfort. Therefore, by carrying out the second winding control in addition to the first winding control described above, the protection of the passenger is ensured without giving much feeling of discomfort to the passenger.

BEST MODE FOR CARRYING OUT THE INVENTION

Figure 1:
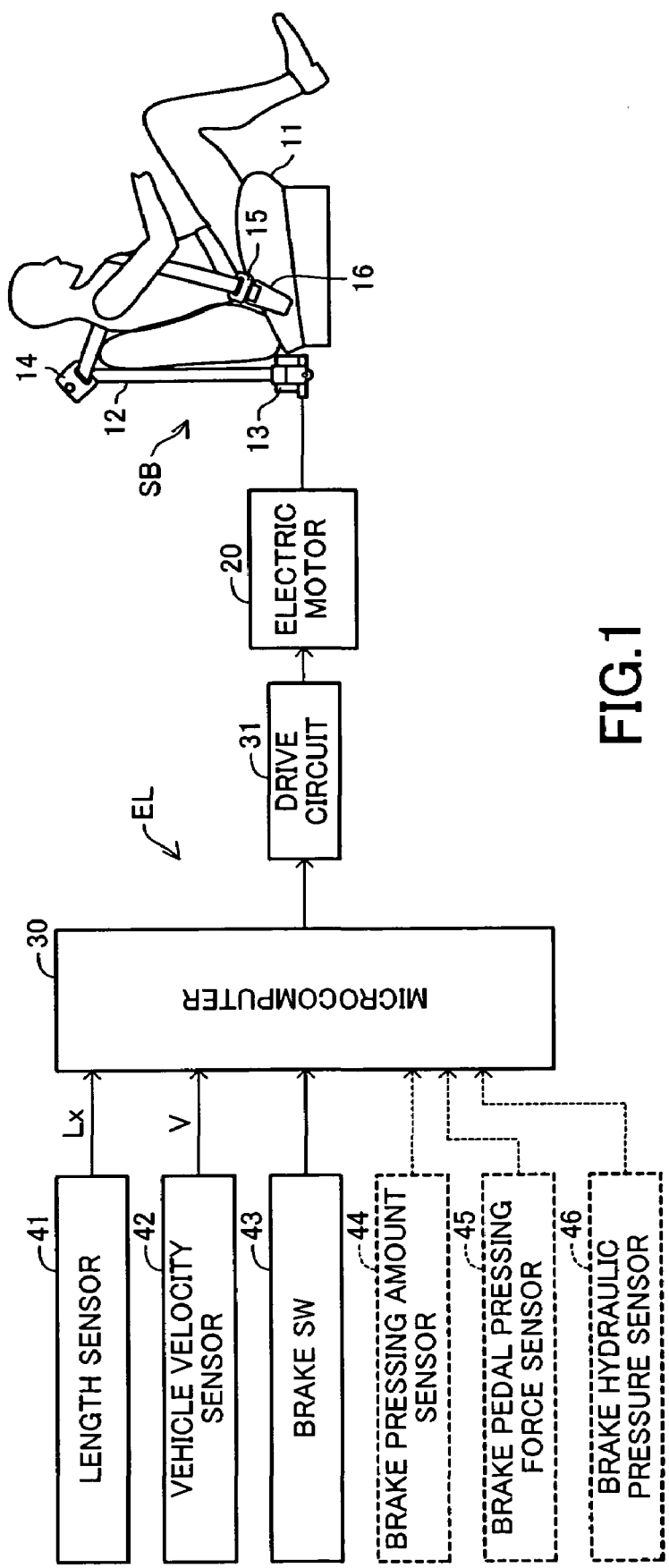
FIG. 1 is a general schematic drawing of a seatbelt apparatus according to an embodiment of the invention.

Referring now to the drawings, an embodiment of the present invention will be described. FIG. 1 schematically shows a vehicle seatbelt apparatus according to the embodiment. The vehicle seatbelt apparatus includes a seatbelt mechanism SB and an electric control device EL.

The seatbelt mechanism SB includes a seatbelt 12 for constraining and protecting a passenger seated on a seat 11. The seatbelt 12 is pulled out from a retractor device 13 provided on one side of the seat 11, is slidably supported by a shoulder belt anchor 14 at a midsection thereof, and is fixed to the other side of the seat 11 at the other end thereof. The midsection of the seatbelt 12 is provided with a tongue plate 15 assembled so as to be capable of moving. The tongue plate 15 is adapted to be detachably fitted to a buckle 16 fixed to the other side of the seat 11. The retractor device 13 includes an electric motor 20 for winding the seatbelt 12 in case of emergency, and a mechanism for prohibiting the wound seatbelt 12 from being pulled out.

Figure 2:
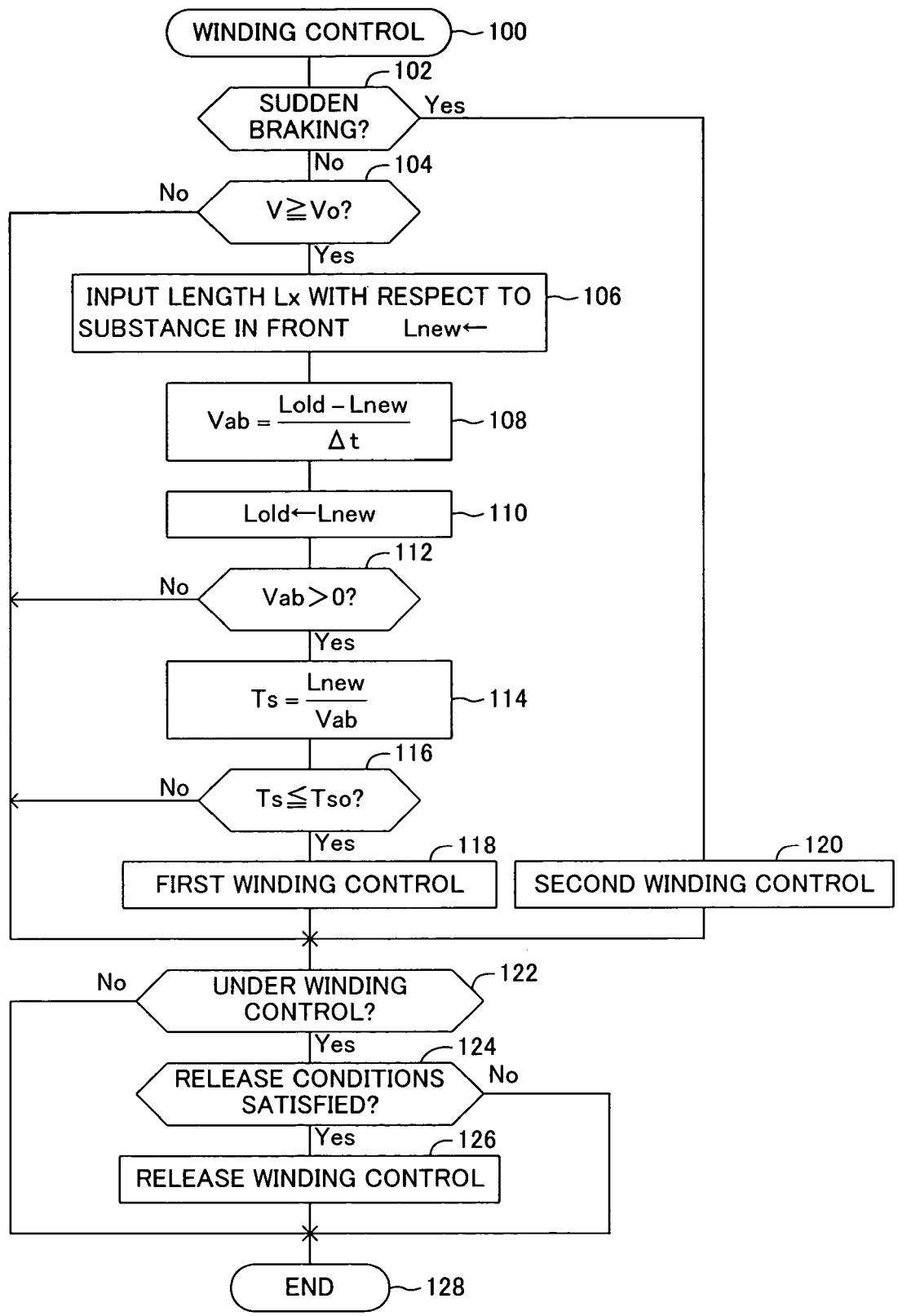
FIG. 2 is a flowchart of a winding control program implemented by a microcomputer shown in FIG. 1.

The electric control device EL includes a microcomputer 30 having a CPU, a ROM, a RAM, and a timer. The microcomputer 30 controls a current amount to be supplied to the electric motor 20 via a drive circuit 31 by repeatedly implementing a winding control program shown in FIG. 2 at predetermined short intervals. Accordingly, a winding load and a rising gradient of the winding load of the seatbelt 12 by the electric motor 20 are controlled. A length sensor 41, a vehicle velocity sensor 42, and a brake switch 43 are connected to the microcomputer 30.

The length sensor 41 includes a radar device using extremely high-frequency wave (millimetric-wave), ultrasonic wave, or the like mounted to a front end of the vehicle, and detects a length Lx from the front end of the vehicle to a substance in front (mainly, a vehicle in front). The vehicle velocity sensor 42 detects a vehicle velocity V by counting the number of revolution of an output shaft of a transmission. The brake switch 43, having a function to detect sudden braking applied by the passenger, is usually in an OFF-state, and is switched to an ON-state when a brake pedal is deeply pressed.

Subsequently, an operation of the embodiment configured as described above will be described. By turning on an ignition switch, the microcomputer 30 starts repeated implement of the winding control program shown in FIG. 2 at predetermined short intervals. The implement of the winding control program is started in Step 100, the microcomputer 30 inputs a signal indicating the state of the brake switch 43 in Step 102, and determines whether the sudden braking is being operated or not depending on whether or not the same switch 43 is in the ON-state is determined.

A case in which the sudden braking is not operated will now be described. In this case, it is determined to be "No" in Step 102, and the procedure goes to Step 104 and onward. In Step 104, the microcomputer 30 inputs the vehicle velocity V detected by the vehicle velocity sensor 42, and determines whether the vehicle velocity V is equal to or higher than a predetermined low vehicle velocity $V_0$ (for example, 5 km/h) or not, whereby the microcomputer 30 determines whether the vehicle is in a traveling state or not. When the vehicle is in a substantially stopped state, and the vehicle velocity V is lower than the predetermined low vehicle velocity $V_0$, it is determined to be "No" in Step 104, and the procedure goes to Step 122. In Step 122, the microcomputer 30 determines whether it is under the winding control of the seatbelt 12 or not in Steps 118, 120 described later. When the microcomputer 30 is not under the winding control of the seatbelt 12, it is determined to be "No" in Step 122, and the implement of the winding control program in Step 128 is ended once.

On the other hand, when the vehicle starts traveling and it is determined to be "Yes", that is, the vehicle velocity V is equal to or higher than the predetermined low vehicle velocity $V_0$ in Step 104, the microcomputer 30 implements the processes from Step 106 and onward. In Step 106, the length Lx from the front end of the vehicle to the substance in front detected by the length sensor 41 is input, and is set as a new length Lnew indicating the input length by the implement of the program of this time. Subsequently, in Step 108, a subtracted vale Lold-Lnew which is obtained by subtracting the new length Lnew from the length Lx input at the time of previous implement of the program (hereinafter, referred to as the previous length Lold) is divided by an implement intervals $\Delta t$ of the winding control program, thereby calculating a relative velocity Vab (=(Lold−Lnew)/$\Delta t$) with respect to the substance in front. The previous length Lold is set to "0" by an initial setting procedure, not shown. In this case, the relative velocity Vab calculated at the first time is a negative value, and it is determined to be "No" in Step 112, described later and hence the procedure goes to Step 122. Therefore, even when the relative velocity Vab calculated at the first time is not suitable, this does not cause a problem.

After having calculated the relative velocity Vab, the previous length Lold is renewed to the new length Lnew for the next calculation of the relative velocity Vab. Subsequently, in Step 112, the microcomputer 30 determines whether the same relative velocity Vab is a positive value or not. When the relative velocity Vab is not a positive value, it is determined to be "No" in Step 112 as described above, and the procedure goes to Step 122. It is because that the fact that the relative velocity Vab is not a positive value means that the length Lx from the front end of the vehicle to the substance in front does not vary, or increases, and in this case, there is no possibility of collision of the vehicle with the substance in front.

On the other hand, when the relative velocity Vab is a positive value, it is determined to be "Yes" in Step 112, and the procedure goes to Step 114. In Step 114, a time Ts (=Lnew/Vab) until the front end of the vehicle collides with the substance in front if the vehicle continues to travel at the current relative velocity Vab is calculated by dividing the new length Lnew by the relative velocity Vab. Hereinafter, the time Ts is referred to as a collision time. Subsequently, in step 116, the microcomputer 30 determines whether the collision time Ts is equal to or lower than a predetermined time $Ts_0$ or not. In this case, the predetermined time $Ts_0$ is set, for example, to a value on the order of 0.5 seconds, which is an estimated time that the front end of the vehicle will collide the substance in front unless the passenger (operator) performs a collision avoiding operation such as pressing of the brake pedal or maneuvering of a steering handle or the like quickly.

When the front end collision time Ts is larger than the predetermined time $Ts_0$, it is determined to be "No" in Step 116, and the procedure goes to Step 122. On the other hand, when the collision time Ts is equal to or lower than the predetermined time $Ts_0$, it is determined to be "Yes" in Step 116, that is, collision predicted, and a first winding control process is carried out in Step 118.

Figure 3:
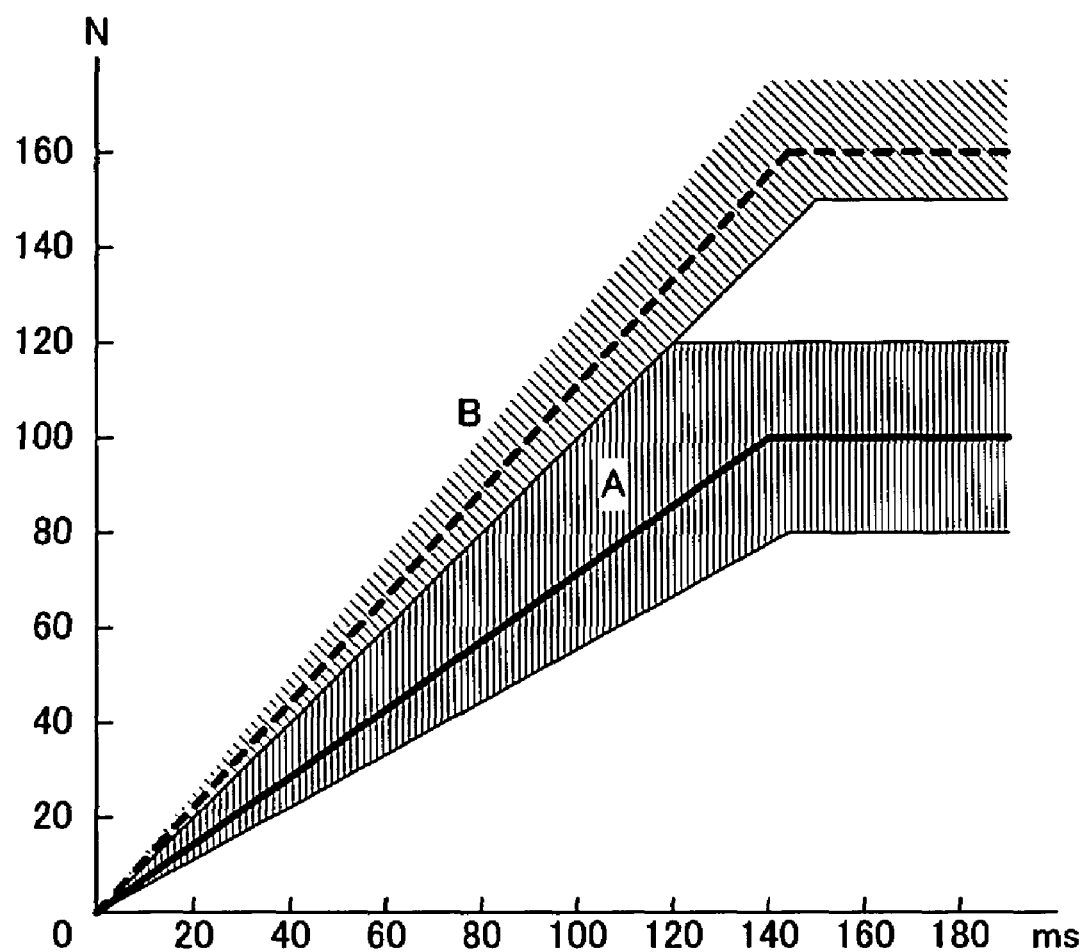
FIG. 3 is a graph showing variations in first and second winding loads with time when a seatbelt is wound by first and second winding control process in the winding control program shown in FIG. 2.

In the first winding control process, the current amount flowing in the electric motor 20 is controlled in such a manner that the winding load of the seatbelt 12 is continuously increased at a predetermined first rising gradient (for example, 100 N/140 ms) and, when it reaches a predetermined first winding load (for example, 100 N), the same first winding load is maintained (see a thick solid line in FIG. 3). By this control of the electric motor 20, the seatbelt 12 is wound in the retractor device 13, and the passenger is constrained by the seatbelt 12.

The inventors obtained the following experimental result relating the first rising gradient and the first winding load. When the first rising gradient is equal to, or larger than, 100 N/180 ms, and smaller than 100 N/100 ms (range A shown in FIG. 3), major part of the people can accept the constraint by the seatbelt 12. In contrast, when the first rising gradient is equal to, or larger than 100 N/100 ms, major part of the people feel that the constraint by the seatbelt 12 is at the acceptable limit, or unacceptable. The lower limit value 100 N/180 ms of the first rising gradient is a value determined from a viewpoint of protection of the passenger.

Relating to the first winding load, when it is in the range between 80 N and 120 N inclusive (the range A in FIG. 3), major part of the people can accept the constraint by the seatbelt 12. In contrast, when the first winding load is equal to, or larger than 120 N, major part of the people feel that the constraint by the seatbelt 12 is at the acceptable limit or unacceptable. The lower limit value 80 N of the first winding load is a value determined from a viewpoint of the protection of the passenger.

Subsequently, a case in which a sudden braking operation is performed in order to avoid collision will be described. In this case, it is determined to be "Yes", that is, the brake switch 43 is in the ON-state, in the above-described Step 102, and a second winding control process is carried out in Step 120.

In the second winding control process, the current amount flowing in the electric motor 20 is controlled in such a manner that the winding load of the seatbelt 12 increases continuously at a second rising gradient (for example, 100 N/90 ms) and, when it reaches the predetermined second winding load (for example, 160 N), it is maintained at the second winding load (see a thick broken line in FIG. 3). By the control of this electric motor 20, the seatbelt 12 is wound in the retractor device 13, and the passenger is constrained by the seatbelt 12 with a constraining force larger than the case of first winding control.

The second rising gradient and the second winding load are set to large values from the viewpoint of protection of the passenger. However, in this case, since the passenger (operator) operates the brake, even when the second rising gradient is 100 N/100 ms or higher, and even when the second winding load is larger than 150 N, many people do not have a feeling of discomfort according to the result of the experiment.

There is a case in which the first winding control is started at a moment when the second winding control is started. In this case, the current amount flowing in the electric motor 20 is controlled so that the winding load of the seatbelt 12 is increased from the winding load of the seatbelt 12 currently under control to the second winding load at the second rising gradient.

In this manner, according to the seatbelt apparatus according to the present embodiment, when the collision is predicted through the procedure in Steps 104-116, the passenger is constrained at a relatively small winding load of the seatbelt 12 which increases at a relatively small rising gradient by the first winding control process in Step 118. Therefore, the passenger does not have a feeling of discomfort and is protected even when the vehicle collides. When the sudden braking operation is performed, the sudden braking operation is detected by the process in Step 102, and the passenger is constrained by a winding load which increases at a larger rising gradient than the first winding control and is larger than the same first winding control by the second winding control process in Step 120. In this case, since the passenger is conscious of the sudden braking operation, he/she does not have much feeling of discomfort even with a relatively large rising gradient and winding load. Then, even though the vehicle collides, protection of the passenger is ensured.

When the first and second winding controls of the seatbelt 12 are carried out, it is determined to be "Yes", that is, to be under winding control in Step 122, and the procedure goes to Step 124. In Step 124, the microcomputer 30 determines whether conditions of releasing the winding control are satisfied or not. Such release of the winding control of the seatbelt 12 is done because it is desirable to release the passenger from the constraint by the seatbelt 12 after the collision is avoided by the steering operation of the passenger, or the vehicle is stopped even when the collision is occurred.

Therefore, in the release condition determination process in Step 124, whether the sudden braking operation by the same procedure as in the above-described Step 102 is released, whether the collision is not predicted through the same procedure as in Steps 104-116, whether the vehicle is in the stopped state, and whether more than the predetermined time is elapsed since the first or the second winding control has started are determined. When these release conditions are not satisfied, it is determined to be "No" in Step 124, and implement of the winding control program is ended once in Step 128. In this case, the first or second winding control process continues.

On the other hand, when the above-described release conditions are satisfied, it is determined to be "Yes" in Step 124, the microcomputer 30 performs a winding control release process for stopping the control of the operation of the electric motor 20 in Step 126, and the implement of the winding control program is ended once in Step 128. Accordingly, the winding load of the seatbelt 12 is reduced, so that the passenger can pull out the seatbelt 12 freely. When the seatbelt 12 cannot be pulled out even when the winding control of the seatbelt 12 is ended due to a locking function of the retractor device 13, it is necessary to perform a process of releasing the locking function.

Although the embodiments of the present invention has been described thus far, carrying out of the present invention is not limited to the above-described embodiments and the modifications thereof, and various changes may be made without departing the object of the present invention.

For example, in the above-described embodiment, the sudden braking operation is detected by the braking switch 43. However, various methods may be considered as regards the sudden braking operation. As shown by a broken line in FIG. 1, it is also possible to provide a brake pedal pressing amount sensor 44 for detecting a pressing amount of the brake pedal, and detect the sudden braking operation under the conditions that the pressing amount of the brake pedal detected by the same sensor 44 or a pressing speed of the brake pedal calculated from the detected pressing amount of the brake pedal is equal to or larger than the predetermined value.

Alternatively, it is also possible to provide a brake pedal pressing force sensor 45 for detecting a brake pedal pressing force and detect the sudden braking operation under the conditions that the brake pedal pressing force detected by the same sensor 45 or the varying speed of the brake pedal pressing force calculated from the detected pressing force is equal to or larger than the predetermined value. In addition, it is possible to provide a brake hydraulic pressure sensor 46 for detecting a hydraulic pressure in a route of brake oil (for example, an output side of a master cylinder for the brake), and detect the sudden braking operation under the conditions that the brake hydraulic pressure detected by the same sensor 46 or the varying speed of the brake hydraulic pressure calculated from the detected brake hydraulic pressure is equal to or larger than the predetermined value.

In the above-described embodiments, the length Lx with respect to the substance in front is detected by the radar device using extremely high-frequency wave (millimetric-wave) or ultrasonic wave. However, it is also possible to provide a camera in front of the vehicle and measure the existence of the substance in front and the length Lx with respect to the substance in front by the same camera.

In the above-described embodiment, prediction of collision is performed by using the vehicle velocity V and the collision time Ts through the process in Steps 104-116. However, instead or in addition to it, it is also possible to predict the collision by the vehicle velocity of the vehicle in question, and the length to the substance in front, or the varying state of the relative velocity to the substance in front.

In addition, in the above-described embodiment, the winding of the seatbelt 12 is performed by the rotation of the electric motor 20. However, it is also possible to employ means other than the electric motor as long as it enables the winding of the seatbelt 12.

The invention claimed is:

1. A vehicle seatbelt winding apparatus comprising:
    a winding motor;
    a collision predicting device configured to predict a collision with an object;
    a brake detecting device configured to detect operation of a brake pedal; and
    a microcomputer configured to:
    control the winding motor so as to wind the seatbelt at a first winding load when a collision is predicted by the collision predicting device;
    control the winding motor so as to wind the seatbelt at a second winding load which is larger than the first winding load based on brake pedal operation as detected by the brake detecting device; and
    control the winding motor so as to release the seatbelt to move freely upon detection of avoidance of the collision with the object while the seatbelt is wound by the winding motor.

2. The vehicle seatbelt winding apparatus according to claim 1, wherein the microcomputer is adapted to increase a winding load of the seatbelt by the winding motor to the first winding load from a moment when the collision is predicted by the collision predicting device at a first rising gradient, and
    the microcomputer is adapted to increase a winding load of the seatbelt by the winding motor to the second winding load from a moment when brake pedal operation is detected by the brake detecting device at a second rising gradient which is larger than the first rising gradient.

3. The vehicle seatbelt winding apparatus according to claim 2, wherein the second rising gradient is set to a value equal to or larger than 100 N/100 ms.

4. The vehicle seatbelt winding apparatus according to claim 2, wherein the first rising gradient is set to a value equal to or larger than 100 N/180 ms and smaller than 100 N/100 ms.

5. The vehicle seatbelt winding apparatus according to claim 1, wherein the second winding load is set to a value equal to or larger than 150 N.

6. The vehicle seatbelt winding apparatus according to claim 1, wherein the first winding load is set to a value between 80 N and 120 N inclusive.

7. The vehicle seatbelt winding apparatus according to claim 1, wherein the collision predicting device continuously detects a length from the vehicle in question to the object of collision, and predicts the collision with the object of collision based on the detected length which varies with time.

8. The vehicle seatbelt winding apparatus according to claim 1, wherein the brake detecting device detects brake pedal operation based on at least any one of a pressing amount, a pressing speed, and pressing force of the brake pedal and a brake hydraulic pressure.

9. The vehicle seatbelt winding apparatus according to claim 1, wherein the microcomputer controls the winding motor to release the seatbelt to move freely based on at least one of detecting steering operation by a vehicle driver, detecting stopping of the vehicle, and a predetermined time has passed without occurrence of the collision.

10. A vehicle seatbelt winding apparatus comprising:
    a winding motor;
    a collision predicting device programmed to predict a collision with an object;
    a brake detecting device configured to detect a brake pedal operation; and
    a microcomputer configured to:
    control the winding motor so as to wind the seatbelt from a moment when the collision is predicted by the collision predicting device while increasing the winding load of the seatbelt at a first rising gradient;
    control the winding motor so as to wind the seatbelt while increasing the winding load of the seatbelt at a second rising gradient which is larger than the first rising gradient from a moment based on brake pedal operation as detected by the brake detecting device; and
    release the seatbelt to move freely upon detection of avoidance of the collision with the object while the seatbelt is wound by the winding motor.

11. The vehicle seatbelt winding apparatus according to claim 10, wherein the second rising gradient is set to a value equal to or larger than 100 N/100 ms.

12. The vehicle seatbelt winding apparatus according to claim 10, wherein the first rising gradient is set to a value equal to or larger than 100 N/180 ms and smaller than 100 N/100 ms.

13. The vehicle seatbelt winding apparatus according to claim 10, wherein the collision predicting device continuously detects a length from the vehicle in question to the object of collision and detects the collision with the object of collision based on the detected length which varies with time.

14. The vehicle seatbelt winding apparatus according to claim 10, wherein the brake detecting device detects brake pedal operation based on at least any one of a pressing amount, a pressing speed, and pressing force of the brake pedal and a brake hydraulic pressure.

15. The vehicle seatbelt winding apparatus according to claim 10, wherein the microcomputer controls the winding motor to release the seatbelt to move freely based on at least one of detecting steering operation by a vehicle driver, detecting stopping of the vehicle, and a predetermined time has passed without occurrence of the collision.

\* \* \* \* \*